Sept. 8, 1931.  W. VAN B. ROBERTS  1,822,061

METHOD AND MEANS FOR MEASURING LIGHT INTENSITIES

Filed April 6, 1929

Inventor
WALTER VAN B. ROBERTS

By his Attorney

Patented Sept. 8, 1931

1,822,061

UNITED STATES PATENT OFFICE

WALTER VAN BRAAM ROBERTS, OF PRINCETON, NEW JERSEY, ASSIGNOR TO RADIO CORPORATION OF AMERICA, A CORPORATION OF DELAWARE

METHOD AND MEANS FOR MEASURING LIGHT INTENSITIES

Application filed April 6, 1929. Serial No. 353,036.

The present invention relates to a method and means for amplifying photoelectric currents, and is particularly directed to a method and means by which photoelectric currents of small values may be amplified.

Further, the invention is particularly concerned with a method and means by which current flowing through a photoelectric cell, which, when exposed to light, is a type of resistance which does not obey Ohm's law, may be readily amplified.

Therefore, as a particular object of my invention, I have sought to develop a method and means by which photoelectric currents of minute values may be readily measured and ascertained.

As a further object of my invention, I have sought to develop a method and means by which currents which do not flow in accordance with the principles of Ohm's law, may be readily measured and ascertained. Such currents include, for example, electron flow from a hot filament, or the electron flow produced by photoelectric actions.

A still further object of my invention is to provide a system and means by which it is possible to avoid the use of the usual direct current amplifiers for amplifying photoelectric currents of small values to such a point that they can be readily measured and determined.

A still further object of my invention is to develop a method and means of arranging circuits such that only those currents which arise from the failure of the photoelectric cells or other appropriate resistances connected in the circuit to obey Ohm's law are amplified.

Other objects of my invention are to develop a method and means of the type to be hereinafter set forth, which is relatively simple in its construction and arrangement of parts, a system which is compact, durable, free from complicated circuit arrangements, efficient in its use, convenient to install, substantially fool-proof and easily operated.

Other objects and advantages of my invention will become apparent and at once suggest themselves to those skilled in the art to which the invention relates by reading the following specification in connection with the accompanying drawings, wherein.

Figure 2:
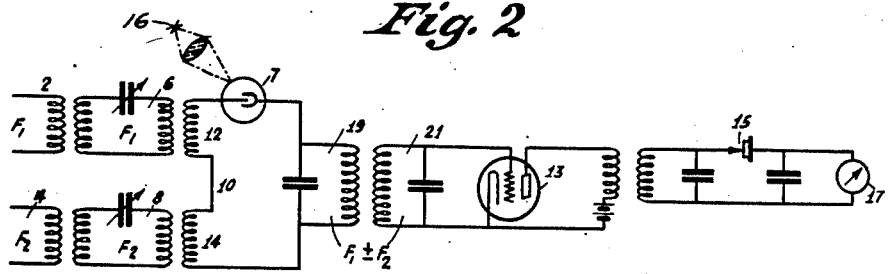
Fig. 2 shows an arrangement by which the sum or difference frequency current, where two independent frequencies are applied to a conductor which passes current in other than direct proportion to applied voltage in the presence of constant illumination, is utilized for current measurements.
Figure 3:
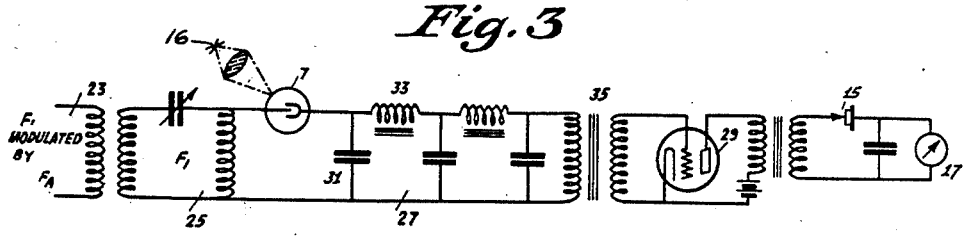
Fig. 3 shows a method making use of the detecting, rectifying, or demodulating action of a conductor which passes current in other than direct proportion to applied voltage in the presence of constant illumination.
Figure 4:
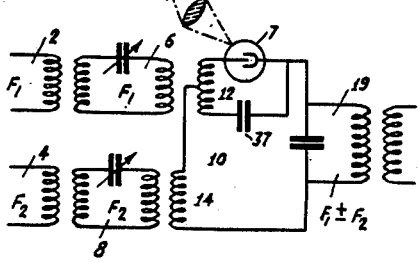
Figure 5:
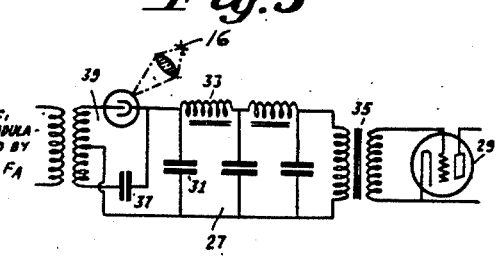

Fig. 4 illustrates a modification of the arrangement shown by Fig. 2, in which a conductor which passes current in other than direct proportion to applied voltage in the presence of constant illumination is connected to form one leg of a bridge structure; and, Fig. 5 illustrates a modification of the general type disclosed by Fig. 4 applied to a circuit arrangement of the type shown and described by Fig. 3.

Now referring more particularly to the drawings forming a part of this invention and illustrating a few of the many modifications of which the same is capable, a photoelectric cell has been shown as forming a part of each circuit. The photoelectric cell has a conductivity of a predetermined order when exposed to light from an external source, but this conductivity is not in the nature of a true ohmic resistance because it does not obey Ohm's law. For example, the current can flow through a photo cell only in one direction. In the absence of illumination upon the photo cell, a small amount of alternating current can flow through the cell by way of the capacity between its electrodes, and this current does obey Ohm's law, that is, it is proportional to the voltage applied.

The methods herein shown for amplifying feeble currents from photoelectric cells have as their common and distinguishing feature the principle of arranging the circuits in such a manner that the only currents which are amplified are those which arise from the failure of the photoelectric cell to obey Ohm's law. Thus, if no light falls upon the photoelectric cell, since it will act as a pure capacity element, Ohm's law is obeyed, and there is no output at the frequency to which the amplifier is adjusted, as will hereinafter become apparent, but, in general, where light strikes the photoelectric cell, it is possible to produce many frequencies, and any particular produced frequency can be utilized in the output circuit in any manner desired. The distorting effect of the photoelectric cell when light strikes the same is to produce frequencies which are not present in the input thereto, and these new frequencies may then be amplified in a desired manner, but care should be taken in each case to make the amplifier sufficiently selective so that only the desired newly produced frequencies may be amplified.

Figure 1:
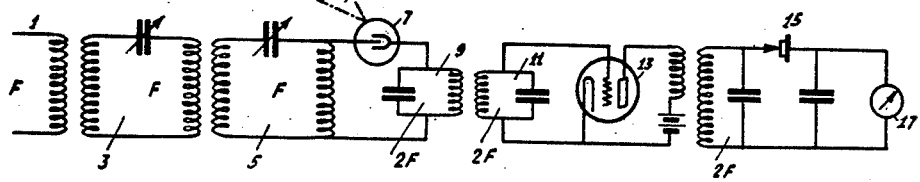
Fig. 1 illustrates an arrangement by which the harmonics produced by a conductor of a type which passes current in other than direct proportion to applied voltage in the presence of constant illumination are utilized for current measurements.

Now, making particular reference to Fig. 1 of the drawings, a source of oscillations of frequency F is supplied through an input circuit 1 and coupled through a tuned link circuit 3 to a second tuned circuit 5, each of which are tuned to the same frequency F so that harmonics of the frequency F may be eliminated. These currents are then applied to the photoelectric cell 7. It will be noted that the tuned link circuits 3 and 5 function the same as band-pass filters and are for the purpose of eliminating all harmonics of the basic frequency F from the photo cell. It will, therefore, be recognized that I can, if desired, substitute for the link circuits 3 and 5, a band-pass filter of well known type, comprising shunt capacity and series inductance.

As light from an external source 16 is directed upon the photoelectric cell 7, as above stated, a distorting effect is produced on the chosen frequency suppled thereto, and this may be, for example, of an effect to produce the second harmonic of the impressed frequency, although it is to be recognized that other harmonics than the second are produced. Therefore, connected in series with the output of the photoelectric cell, I have arranged a tuned trap circuit 9 tuned to the frequency 2F, to select out the double frequency of the impressed frequency F when light falls upon the cell. The double frequency current may then be amplified to whatever extent is necessary by means of an amplifier which is tuned to the frequency 2F, for example, by means of the tuned circuit 11.

Therefore, currents impressed upon the input of the amplifier 13 are all of the double frequency of the originally impressed frequency, and may be amplified to whatever extent is necessary and finally rectified in any suitable manner by a crystal detector 15, for example, and the rectified currents may then be used to produce an indication upon an indicator connected in series therewith, which indicator may be of any well known type of galvanometer 17.

In using a method of this type, the only precautions which must be taken are to be certain that the tuned link circuits are such that only voltages of the initially impressed frequency F are applied to the photo cell 7 so that current of frequency 2F will be supplied to the amplifier only as a result of the light which falls upon the photoelectric cell. It will also be recognized that if desired, the usual type of vacuum tube detector may be substituted for the crystal detector indicated, but should this substitution be made, it will be noted that there will be current flowing through the galvanometer even during periods when no voltages are being applied to the amplifier.

Now making particular reference to Fig. 2, it will be noted that an arrangement has been shown wherein it is not so highly essential to carefully filter all of the harmonics from the oscillator supplying a frequency of any desired value to the photoelectric cell, because, as shown, the amplifier 13 in this case is not tuned to a harmonic of either of the impressed frequencies. As shown, frequencies $F_1$ and $F_2$ are supplied to the photoelectric cell 7 from sources 2 and 4 respectively, and are passed through the tuned trap circuits 6 and 8, tuned respectively by means of variable capacity elements contained therein to the frequencies $F_1$ and $F_2$. Each of these frequencies are then impressed on the circuit 10, which includes, the photoelectric cell 7, the inductances 12 and 14 coupled respectively to the tuned circuits 6 and 8. In this case, it is to be noted that care should be taken to prevent the voltage of one oscillator from reaching the other so as to set up perhaps the sum and difference frequency to which the amplifier is tuned. However, an arrangement of this type has been found to be quite satisfactory since if, for example, the frequency $F_4$ should be transferred to the oscillator producing the frequency $F_2$, it will be noted that the sum and difference frequency of $F_1$ and $F_2$ will be blocked from the photo cell by means of the tuned trap circuit 8 tuned to the frequency $F_2$ which would be unresponsive to the sum and difference frequency of $F_1$ and $F_2$, and likewise, if the frequency of oscillator $F_2$ reached the oscillator producing frequency $F_1$, the tuned trap circuit which is tuned to frequency $F_1$ would prevent the sum and difference frequency of $F_2$ and $F_1$ from reaching the photo cell 7.

As was shown in connection with Fig. 1, I have connected in series with the photo cell 7 a tuned trap circuit 19, which is preferably tuned to the sum or difference frequency of frequencies $F_1$ and $F_2$ so that the tuned circuit 21 connected with the input circuit of the amplifier 13 which is tuned to the same frequency will be unresponsive to harmonics produced by light falling upon the cell, and, as will be noted, the means for amplifying the currents produced in the amplifier, by virtue of light striking the cell 7, is the same as was illustrated and described in connection with Fig. 1.

To refer now to the method shown and illustrated by Fig. 3, as a further modification of the arrangements of Figs. 1 and 2, I have provided an unusually simple method for determining photoelectric currents which consists in applying a high frequency voltage of a frequency $F_1$, modulated by a second low frequency $F_A$ to the photoelectric cell, and then using the photoelectric cell as a detector. The modulated current from the circuit 23 is transferred to the tuned circuit 25, tuned by means of a capacity element of the usual variable type, to the frequency $F_1$, and this modulated current is then impressed upon the photoelectric cell 7 serving as a detector. When no light falls upon the cell, there is no detecting action, and what little radio frequency current passes through the photoelectric cell due to its capacity action is blocked from the amplifier 29 by means of the filter circuit 27 consisting of a plurality of small capacity elements 31 all connected in shunt and a series of radio frequency choke coils 33, series connected so that no energy of frequency $F_1$ can reach the input circuit of the amplifier 29 by way of the transformer coupling 35.

However, if light falls upon the photoelectric cell 7, it converts the cell at once into a rectifier and produces currents of the modulation frequency $F_A$ which will pass readily through the low-pass filter 27 and may then readily be impressed by means of the transformer 35 upon the amplifier tube 29. This amplifier is preferably tuned to frequency $F_A$ to avoid amplification of other stray voltages. As is apparent from the drawings, the output energy from the amplifier 29 is then rectified in the same manner as was shown in connection with the description of Figs. 1 and 2, or in case the frequency $F_A$ is chosen sufficiently low, the output circuit of the amplifier 29 may be connected directly with a vibration galvanometer instead of by way of the rectifying device 15 and the direct current galvanometer 17, as shown.

In using this last described method, certain precautions, which may easily be fulfilled, should be taken, and the first of these is, that it must be made certain that no current of the frequency $F_A$ is impressed upon the photo cell 7 as this would get through the cell capacity and filter 27 to some extent and give an output energy which is independent of the illumination of the photo cell, and, secondly, the filter 27 must be of such a type that all radio frequency currents will be blocked therefrom, and it must be disposed between the cell and the first vacuum tube amplifier since, otherwise, the capacity currents through the cell might reach the first amplifier tube 29 and, due to the rectifying action inherent in vacuum tubes, would set up spurious currents of frequency $F_A$ which could then be transferred through the rectifier 15 of the galvanometer 17.

By Fig. 4, I have disclosed one of the various refinements for the circuit arrangement of Fig. 2 which may be in the form of a bridge circuit about the photoelectric cell 7, wherein the inductance 14 coupled with the tuned trap circuit 8, tuned to the frequency $F_2$, may be connected to the midpoint of the inductance 12, coupled with the trap circuit which is tuned to the frequency $F_1$, and a capacity element 37 is connected so as to form the fourth leg of the bridge arrangement. The capacity element 37 should be so adjusted so as to be a capacity value equal to that of the photoelectric cell at zero illumination. Although not shown, the capacity 37 may be varied where desired so as to balance the photoelectric cell capacity for all conditions. This bridge arrangement which has two adjacent legs, each formed from half the inductance 12 and the other two legs formed, one by the capacity of the cell 7 and the other by the capacity element 37, prevents voltages at the frequency $F_1$ from producing any current in the link circuit 8 of the other input, and vice versa, and also insures that the tuning of one link circuit 6 or 8 will be unaffected even to the slightest extent by the tuning of the other link circuit, and thus precludes any possibility of currents of the sum and difference frequency from being impressed upon the photo cell 7. A tuned trap circuit 19 of the type shown in connection with Fig. 2 is connected in series with the photo cell 7 and is tuned to the sum or difference frequency of the frequencies $F_1$ and $F_2$, and these currents may then be amplified in the manner disclosed in connection with Fig. 2.

By Fig. 5 I have shown an arrangement of the same general type disclosed in connection with Fig. 4 as applied to a circuit arrangement of the type illustrated by Fig. 3, and have shown a similar bridge circuit 39 provided with a similar capacity element 37 for balancing the tube capacity so that no high frequency reaches the first tube 29 of the amplifying system.

The methods hereinabove disclosed are also applicable to the detection of non-linear or asymetric conduction in any device, and their chief virtue lies in the fact that there is no current through the galvanometer except when there is a failure of the device of the same general nature and characteristics as the photoelectric cell 7 to obey Ohm's law.

While the invention has been particularly described in its application to the measurement of photoelectric currents produced by the electronic flow from a photoelectric member when subjected to light, it is also within the scope of my invention to measure the temperature of a filament member of a vacuum tube, for example. In this application the electronic flow is a function of both filament temperature and impressed voltage, and with changes in temperature, in such a case, the indications produced, similar to the photoelectric indications, will change. In general, the invention is applicable to all types of conducting elements where conductivity is a function of both the impressed voltage and some other factor, such as, for example, light, temperature, magnetic field, and electrostatic field strength, as well as other similar factors. In general, the procedure is similar in all cases. As has been illustrated, voltages of predetermined frequencies are applied to the conducting element, and simultaneously the other factor controlling the conductivity operates. In the case illustrated, it has been light which is the other factor applied simultaneously with the impressed voltage of known frequency. As a result of the simultaneous application of the aforesaid voltages and the other factor currents of new frequencies (frequencies other than those originally impressed) are produced, and these new frequencies are utilized as a measure of the aforesaid other factor. Of course, it is to be understood that these conditions obtain only where the elements have non-linear characteristic (not obeying Ohm's law) in the presence of the second factor.

Having now disclosed my invention in several of its preferred forms, it will at once become apparent to those skilled in the art to which the invention relates that many modifications and changes may be made therein without departing from its spirit and scope, and I therefore believe that the illustrations and description hereinabove set forth should be regarded in a generic and not limiting sense, and I should be entitled to such modifications as may readily suggest themselves provided such modifications fall within the spirit and scope of the hereinafter appended claims.

Having now described my invention, what I claim and desire to secure by Letters Patent is the following:

1. A method of measuring light intensity which includes producing currents of a predetermined frequency value, impressing the produced currents upon a light responsive element, applying light intensities of unknown value upon said element, distorting the said impressed currents by said applied light and thereby producing harmonics of the impressed frequency, amplifying only the harmonic frequencies produced, and indicating the applied light intensity from said amplified harmonics.

2. A method of producing an indication which is a function of light value which includes producing currents of predetermined frequency values, impressing the said frequencies upon a light responsive element which passes current in other than direct proportion to applied voltage in the presence of constant illumination, applying light upon said light responsive element, distorting the impressed frequencies by the non-linear characteristics of the element produced by said application of light to said element, producing by said distortion currents of frequencies other than the originally impressed frequencies, and utilizing these newly produced frequencies for producing an indication.

3. A method of measuring light intensity which includes producing currents of predetermined frequency values, impressing the produced currents upon a light responsive element, applying light intensities of unknown values upon said element, distorting the said impressed currents by said applied light and thereby producing currents of frequencies other than the originally impressed frequencies, amplifying the currents of frequencies other than the originally impressed frequencies, and producing an indication of the applied light intensities from said amplified currents.

4. A method of detecting currents flowing through an element whose resistance depends upon current strength which includes producing currents of predetermined frequency values, impressing the produced currents upon the said element and thereby producing currents of frequencies other than the originally impressed frequencies, and producing an indication from the said newly produced frequencies.

5. A method of measuring light intensity which comprises producing currents of predetermined frequency values, impressing the said frequencies upon a light responsive element, applying light of unknown intensity upon said light responsive element, distorting the impressed frequencies by said application of light to said element, producing by said distortion currents of frequencies other than the originally impressed frequencies, and measuring the conductivity of the said light responsive element by utilizing said newly developed frequencies.

6. A method of producing an indication whose magnitude is a function of the light reaching a light responsive element which comprises producing currents of predetermined frequency values, impressing the said frequencies upon the light responsive element, applying light upon said light responsive element, distorting the impressed frequencies by said application of light to said element, producing by said distortion currents of frequences other than the originally impressed frequencies, and measuring the conductivity produced by the application of light upon said element by a measurement of the said newly developed frequencies.

7. A method of measuring light intensity which includes producing currents of predetermined frequency values, impressing the produced currents upon a light responsive element which passes current in other than direct proportion to applied voltage in the presence of constant illumination, applying light of undetermined value to said element, and detecting the presence of current flowing through the element by distorting the originally impressed frequencies by the application of light thereto for producing currents of frequencies other than the originally impressed frequencies.

8. A system for measuring light intensity which includes a light sensitive element which passes current in other than direct proportion to applied voltage in the presence of constant illumination, means for applying a frequency of a predetermined value thereto, means for subjecting said light sensitive element to light of unknown intensity, thereby producing currents of a frequency other than that originally impressed, means for amplifying the currents of the frequency produced by said element, and means for indicating the light intensity reaching said element from said amplified currents.

9. A light measuring system which includes a light sensitive cell which passes current in other than direct proportion to applied voltage in the presence of constant illumination, means for impressing frequencies of predetermined values upon said cell, means for applying light of unknown intensity upon said cell for producing currents from said cell of frequencies other than the impressed frequencies, means for amplifying the currents of the produced frequencies, and means for indicating light values reaching said cell in proportion to the strength of the said amplified currents.

10. In a system for measuring light intensity, a photoelectric cell which passes current in other than direct proportion to applied voltage in the presence of constant illumination, means for impressing a plurality of different frequencies simultaneously upon said cell, means for impressing light values of unknown intensities upon said cell for distorting the original frequencies impressed on said cell and producing therefrom currents of the sum and difference frequency of said impressed frequencies, means for amplifying the currents of the frequencies produced by said distortion, and means for indicating the values of said amplified currents.

11. A system for measuring light intensity as claimed in claim 10 including, in addition, means for preventing one of the impressed frequencies upon said cell from affecting other of said impressed frequencies prior to reaching said cell.

12. A means for measuring light intensity as claimed in claim 10 including, in addition, a neutralizing system shunting said cell for preventing impressed frequencies from affecting each other prior to the time when subjected to distortion by light intensities reaching the said cell.

WALTER van BRAAM ROBERTS.